United States Patent [19]

Noguchi et al.

[11] Patent Number: 4,469,283

[45] Date of Patent: Sep. 4, 1984

[54] COFFEE MILL

[75] Inventors: Yoshihiro Noguchi, Gunma Seisakusho; Toshio Nakajima, Ojima, both of Japan

[73] Assignee: Mitsubishi Denki Kabushiki Kaisha, Tokyo, Japan

[21] Appl. No.: 373,102

[22] Filed: Apr. 29, 1982

[30] Foreign Application Priority Data

| May 29, 1981 | [JP] | Japan | 56-78837[U] |
| May 29, 1981 | [JP] | Japan | 56-78839[U] |
| May 29, 1981 | [JP] | Japan | 56-82011 |
| Jul. 31, 1981 | [JP] | Japan | 56-113906[U] |
| Dec. 23, 1981 | [JP] | Japan | 56-192152[U] |

[51] Int. Cl.³ .............................................. B02C 19/12
[52] U.S. Cl. ............................. 241/48; 241/57; 241/79.1; 241/82; 241/282.1
[58] Field of Search ................. 241/48, 55, 56, 57, 241/100, 82, 69, 79.1, 79.2, 282.1, 282.2, 285 A, 285 B; 426/482

[56] References Cited

U.S. PATENT DOCUMENTS

| 2,045,591 | 6/1936 | Falla | 426/482 |
| 2,417,078 | 3/1947 | Jones | 241/48 |
| 2,930,596 | 3/1960 | Waters | 241/282.2 X |
| 2,982,483 | 5/1961 | Heinemans | 241/100 |
| 3,089,652 | 5/1963 | Haber | 241/282.1 X |
| 4,183,471 | 1/1980 | Pfister | 241/57 |

Primary Examiner—Mark Rosenbaum
Attorney, Agent, or Firm—Oblon, Fisher, Spivak, McClelland & Maier

[57] ABSTRACT

A coffee mill comprises a coffee bean pulverizing cutter held in a mill casing, a space for catching skin slivers and fine fragments of coffee beans and a cutter receiving space communicated with the catching space. Air flow is produced between these spaces during pulverizing the coffee beans to move the skin slivers to the catching space.

58 Claims, 9 Drawing Figures

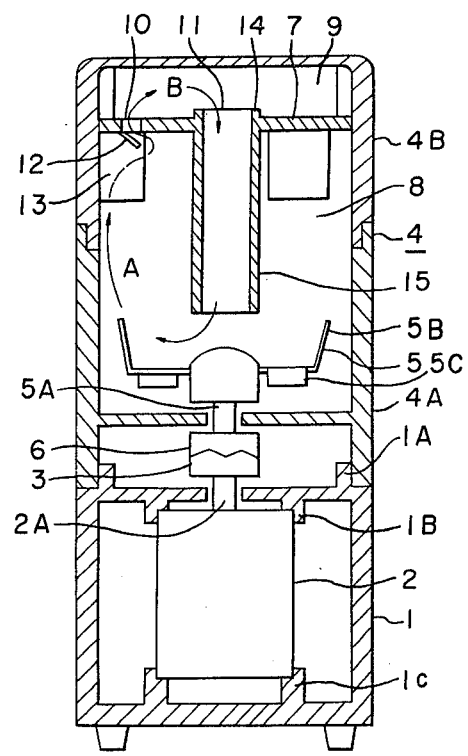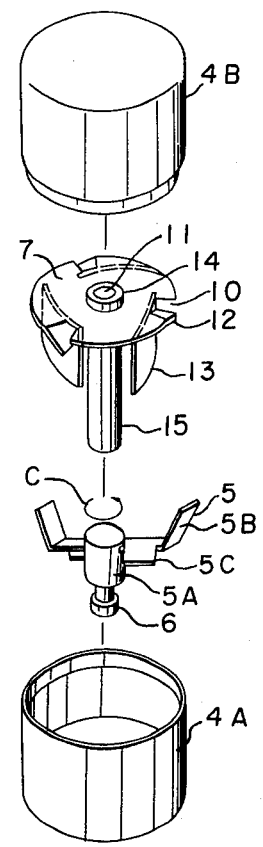
FIG. 1
FIG. 2

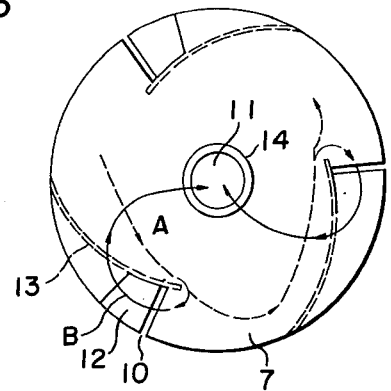
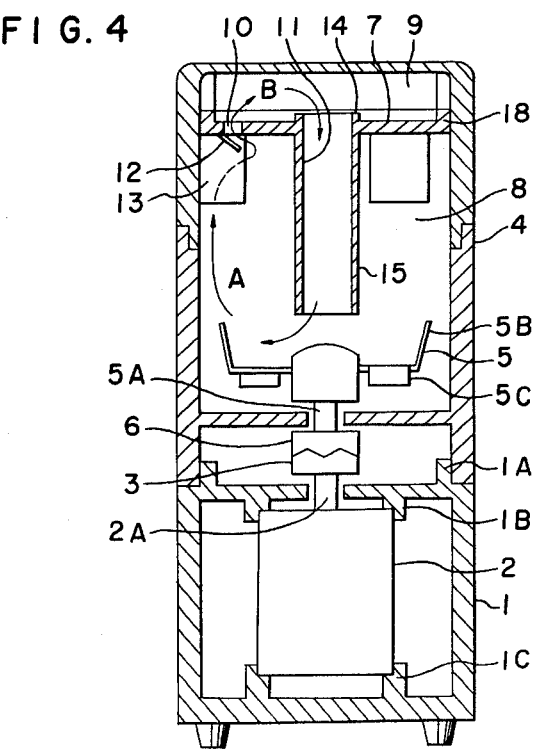

4,469,283

COFFEE MILL

BACKGROUND OF THE INVENTION

1. Field of the Invention

The present invention relates to a coffee mill for pulverizing by the revolution of a cutter, coffee beans held in a mill casing. More particularly, it relates to a coffee mill for removing waste components of coffee beans during the pulverizing of the coffee beans.

2. Description of the Prior Art

It has been known to use freshly ground coffee powder in order to extract liquid coffee. It is indispensable to remove waste components which are useless for the taste of coffee from the coffee powder in order to further improve the taste. Especially, skin slivers and fine fragments produced by the pulverization of the coffee beans deteriorate the taste of the coffee liquid. Some coffee shops remove the skin slivers and the fine fragments to extract high quality liquid coffee.

In a coffee mill for domestic use, however, the coffee beans are pulverized in a way such that the skins sliver and the fine fragments are included in the coffee powder. It is quite difficult to separate them after the pulverization process.

SUMMARY OF THE INVENTION

It is an object of the present invention to overcome the above disadvantage of the conventional coffee mill.

The foregoing and the other objects of the present invention have been attained by providing a coffee mill which comprises a coffee bean pulverizing cutter held in a mill casing, a coffee beans waste component catching space communicated with a cutter receiving space in the mill casing and an air flow producer for producing air flow passing between the coffee bean waste component catching space and the cutter receiving space through a through hole. Waste components of the coffee beans are carried by the air flow to the coffee bean waste component catching space during pulverizing of the coffee beans, whereby high quality liquid coffee can be simply obtained by the automatic separation of the waste components of the coffee beans, such as skin slivers and fine fragments, from usable components of the coffee beans useful for the extraction of high quality liquid coffee, when grinding coffee beans using the coffee mill.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a sectional view of the first embodiment of the coffee mill of the present invention;

FIG. 2 is a schematic view of the mill casing of the coffee mill shown in FIG. 1 in a disassembled state;

FIG. 3 is a plan view of the partition wall of the coffee mill shown in FIG. 1;

FIG. 4 is a vertical sectional view of the second embodiment of the coffee mill of the present invention;

DETAILED DESCRIPTION OF THE PREFERRED EMBODIMENT

Figure 5:
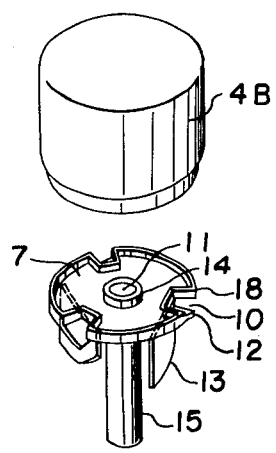
FIG. 5 is a schematic view of the mill casing of the coffee mill shown in FIG. 4 in a disassembled state.

Several embodiments of the present invention will be described with reference to the drawings. The first embodiment of the present invention will be described with reference to FIGS. 1 to 3. In the figures, the reference numeral 1 designates a hollow motor casing made of a synthetic resin which holds a motor 2. A rib 1A is formed in the surface of the upper wall of the hollow motor casing to fit with the lower end of a mill casing 4 which is described below. The reference numeral 2 designates the conventional motor which is fixed by motor supporters 1B and 1C formed in the motor casing 1. The rotor shaft 2A of the motor extends from the upper wall of the motor casing 1 and is driven in the direction C (FIG. 2) by closing the switch of a power source (not shown). The reference numeral 3 designates a first coupling fixed to the end of the rotary shaft 2A of the motor 2 and 4 designates the mill casing which is detachably mounted to the motor casing 1. The mill casing includes a cylindrical cup-like mill casing body 4A whose top is open and a cylindrical cup-like mill casing cover 4B made of a semitransparent synthetic resin, which is detachable so as to open and close the upper opening of the mill casing body 4A. When the mill casing is mounted on the motor casing 1, the inner periphery of the lower end of the mill casing body 4A is fitted to the rib 1A of the mill casing 1 to prevent easy detachment.

The reference numeral 5 designates a coffee bean pulverizing metallic cutter including a rotary shaft 5A. Two flat vanes 5B of the cutter each respectively have a radial, horizontal portion fixed to the rotary shaft 5A and a radially outwardly raised portion fixed to the radially outer end of the radial, horizontal portion. A flat blade 5C is formed on one side of each horizontal portion of each vane 5B and slants downward in the direction opposite the direction of revolution of the rotary shaft 5A.

An air flow designated by the arrows A and B is produced by rotating the rotary shaft 5A passing through the center of the bottom wall of the mill casing body 1. A second coupling 6 is fixed to the end of the rotary shaft 5A of the cutter 5, which transmits the rotation of the motor 2 to the cutter by engaging with the first coupling 3 when the mill casing 4 is mounted on the motor casing. A circular disc 7 constitutes a partition wall made of a semitransparent synthetic resin which is detachably fitted in the mill casing cover 4B, and separates the interior of the mill casing 1 into a cutter receiving space 8 for pulverizing coffee beans, and a coffee bean waste component catching space 9 for catching waste components of coffee beans, such as skin slivers and fine fragments of coffee beans. The diameter of the partition wall is such that the dropping of the partition wall is prevented by the friction of contact with the mill casing cover 4B which can be easily removed from the mill casing 4B when the partition wall is fitted to the mill casing cover.

First through holes 10 are formed by cutting the peripheral portion of the partition wall 7 at circumferential angles of 120° so that the cutter receiving space 8 communicates with the coffee bean waste component catching space 9. A second through hole 11 is formed at the center of the partition wall 7 to communicate the cutter receiving space 8 with the coffee bean waste component catching space 9. Second guiding members 12 made of synthetic resin are formed below each of the three first through holes 10 of the partition wall 7, in one piece with the partition wall, so that each guiding member substantially covers one of the first through holes 10 (in plan view). The distal end of each guiding member 12 is directed downward in the direction of revolution of the cutter (toward the cutter-receiving space).

Three first guiding members 13 made of synthetic resin are respectively unitarily formed with the partition wall 7 in positions corresponding to the respective first through holes 10 and the second guiding members 12. Each first guiding members 13 extend downwards (toward the cutter-receiving space). Each first guiding member 13 also extends, while curving inwardly in the direction of rotation, from the radially outer edge of the partition, and along the periphery of one of the first through holes 10, to a point slightly beyond the first through hole 10.

An annular wall 14 is formed around the circumference of the second through hole 11 of the partition wall 7 so as to project upwardly (toward the coffee bean waste component catching space). A hollow cylindrical body 15 is formed around the second through hole 11 of the partition wall 7, unitary with the first cylindrical body so as to project downwardly (toward the cutter receiving space) to face the center of the cutter 5.

Figure 9:
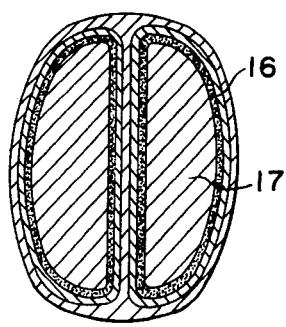
FIG. 9 is a sectional view of the coffee bean.

The process for pulverizing coffee beans and removing waste component of the coffee beans in the coffee mill will be described. Coffee beans are put into the cutter receiving space 8 formed in the mill casing body 4A after taking off the coffee mill cover 4B. The cover 4B, with the partition wall 7 and the mill casing 4, are placed onto the motor casing 1 as shown in FIG. 1 and the switch of a power source (not shown) is turned on to drive the motor, whereby the motor 2 is rotated at high speed in the direction shown by the arrow C in FIG. 2. The revolution of the motor is transmitted through the first coupling 3 and the second coupling 6 to the cutter 5. The coffee beans are pulverized by the cutter 5 rotating at high speed. When the pulverizing is started, the skin 16 of the coffee beans is separated from the body 17 of the coffee beans (FIG. 9) which gradually become thin. At the same time, air flows shown by the arrows A and B are produced by the centrifugal fan effect of the revolving cutter 5. The air flow A is a circulating air flow which is directed upwards and in the direction of revolution of the cutter 5 in the cutter receiving space 8 so as to flow into the coffee bean waste component catching space 9 through the first through holes 10. The air flow B is returned to the cutter receiving space 8 through the second through hole 11 and the hollow cylindrical body 15.

The waste components such as skin slivers and fine fragments of the body 17 of coffee beans which have an extremely light weight are carried by the air flow which passes from the cutter receiving space 8 through the first through holes 10 to the coffee bean waste component catching space 9. The air flow fed to the catching space 9 is returned to the cutter receiving space 8 through the second through hole 11 of the partition wall 7 and the hollow cylindrical body 15. The speed of the air flow after passing the first through holes 10 is, however, decreased by sudden diffusion in the coffee bean waste component catching space 9, whereby the waste component of the coffee beans, such as skin slivers, is accumulated in the catching space 9 without returning to the cutter receiving space 8.

On the other hand, coffee powder which is desired for extraction of high quality liquid coffee continues to move in the direction of revolution of the cutter 5 (FIG. 3) and, because of its having greater size and weight, is accumulated on the bottom of the cutter receiving space 8 without entering into the coffee bean waste component catching space 9 due to the air flow. Thus, the waste component of the coffee beans, which causes poor taste for liquid coffee can be automatically separated from the useful component of the coffee beans during pulverizing the coffee beans.

When the coffee beans are ground to coffee powder having a predetermined particle size, the motor 2 is stopped and the mill casing cover 4B is removed from the mill casing body 4A. The coffee powder having a desired particle size is taken out from the mill casing body 4A and put into a well known coffee extractor for extraction of liquid coffee. The waste components such as skin slivers and fine fragments of coffee beans caught in the coffee bean waste component catching space 9 can be disposed by removing the partition wall 7 from the mill casing cover 4B.

In this embodiment, the cutter receiving space 8 and the coffee bean waste component catching space 9 are formed in the mill casing 4 by fitting the partition wall 7 in the mill casing 4 whereby it is unnecessary to provide a separate container for the coffee bean waste component catching space 9. Thus, a coffee mill having a very simple structure and capable of automatically separating waste components of coffee beans from the useful component during pulverization can be provided.

In accordance with the embodiment of the present invention, it is unnecessary to form the first and second through holes 10 and 11 in the mill casing 4, by providing these holes 10 and 11 in the partition wall 7, whereby an additional machining operation for the mill casing can be eliminated.

In accordance with the embodiment, the first through holes 10 are formed in the peripheral portion of the partition wall 7 and the second through hole 11 is formed at the center of the partition wall 7, whereby the circulating air flow can be provided to effectively catch the waste components in the coffee beans waste component catching space 9.

In accordance with the embodiment, one end of each first guiding member 13 is placed at the peripheral portion between the first through holes 10 of the partition wall 7 and extends to a point slightly beyond the inner portion of one of the first through holes 10, while inwardly curving along the direction of revolution of the cutter. With this structure, more effective air flow passing through the first through holes 10 can be provided thereby providing a good carrying function and a high separating property of the waste component of the coffee beans. The coffee beans are thus mixed in the cutter receiving space 8 to cause movement from the outer periphery to the interior of the space 8 during pulverizing of the coffee beans, thereby uniformly pulverizing the coffee beans.

In accordance with the embodiment, the second guiding members 12 are formed unitarily with the partition wall 7 below the first through holes 10 and the end of the second member 12 extends downwards in the direction of rotation of the cutter so as to substantially close the first through hole 10 (in the plan view). Therefore, the air flow entering the coffee bean waste component catching space 9 through the first through holes 10 of the partition wall 7 can be guided through the first through holes 10 in the obliquely upward direction which is opposite the direction of revolution of the cutter with smooth air flow so that the waste components of the coffee beans are easily caught in the coffee bean waste component catching space 9. Accordingly, the coffee powder, which is desirable for extracting liquid coffee, moving to the upper part of the cutter receiving space 8, collides with the second guide member 12 due to its larger size, to again fall in the cutter receiving space 8. Thus the coffee powder is completely prevented from entering into the coffee bean waste component catching space 9 through the first through hole 10 by the change of direction required by the first member 13 and by the blockage of the first member 12, thereby improving separation of the waste components of the coffee beans.

In accordance with the embodiment, the annular wall 14 is formed at the periphery of the second through hole 11 of the partition wall 7 so as to project upwards (toward the coffee beans waste component catching space). When the air flow passing through the coffee beans waste component catching space 9 is returned to the cutter receiving space 8, through the second through hole 11 and the hollow cylindrical body 15, the air flow has the tendency to carry the waste components of the coffee beans accumulated in the coffee bean waste component catching space 9 into the cutter receiving space 8. The annular wall 14, however, prevents movement of the waste component, whereby the waste components of the coffee beans in the coffee bean waste component catching space 9 do not enter into the cutter receiving space 8.

In accordance with the embodiment, the hollow cylindrical body 15 projects downwards (toward the cutter receiving space) from the periphery of the second through hole 11 of the partition wall 7 to face just above the center of the cutter 5, whereby the air flow can be effectively circulated between the cutter receiving space 8 and the coffee bean waste component catching space 9 through the first and second through holes 10 and 11.

In accordance with the embodiment, the cutter 5 comprises the vanes 5B and the blades 5C which extend obliquely downwards and in the direction opposite that of revolution of the cutter whereby the air flow can be effectively directed upwards by the blades 5C thereby providing a high carrying function and a high separating and catching function for the waste component of the coffee beans.

In accordance with the embodiment, the first and second guiding members 12, 13, the annular wall 14 and the hollow cylindrical body 15 are all formed on the partition wall 7 whereby the handling and cleaning of the assembly are easy.

In the aforementioned embodiment, a fine gap may be produced between the outer circular surface of the partition wall 7 and the inner circular surface of the mill casing 4 if the accuracy of construction is low. In this case, air flows through the fine gap to return the waste components of the coffee beans caught in the coffee bean waste component catching space 9 through the gap or to clog the gap with the material.

Figure 6:
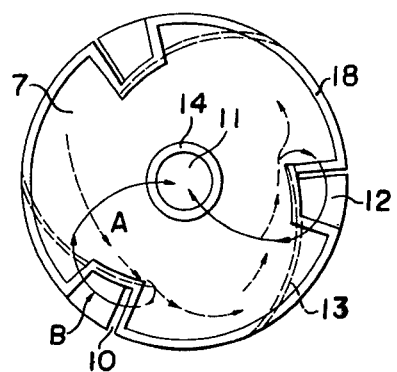
FIG. 6 is a plan view of the partition wall of the coffee mill shown in FIG. 4.

FIGS. 4 to 6 illustrate a second embodiment of the coffee mill of the present invention which solves the problem of the leakage though such a fine gap between the outer circular surface of the partition wall 7 and the inner circular surface of the mill casing 4. In the second embodiment of the coffee mill of the present invention illustrated in FIGS. 4 to 6, an annular wall 18 is unitarily formed with the partition wall 7 and projects upward (toward the coffee beans waste component catching space) from the outer peripheral portion of the partition wall 7 near the first through holes 10.

In accordance with the second embodiment, even though a fine gap is produced between the mill casing 4 and the partition wall 7, due to inaccurate machining of the mill casing or the partition wall 7, and waste components of coffee beans caught in the coffee bean waste component catching space 9 are carried to the outer circular part of the partition wall 7 by air passing through the fine gap, further movement of the waste components is prevented by the annular wall 18 whereby no waste components of the coffee beans are returned to the cutter receiving space 8. The construction of the other parts of the second embodiment is the same as that of the first embodiment. Accordingly the detailed description concerning these parts is omitted.

In the first and second embodiments, it is necessary to remove the partition wall in order to dispose of the waste components of the coffee beans caught in the coffee bean waste component catching space 9.

Figure 7:
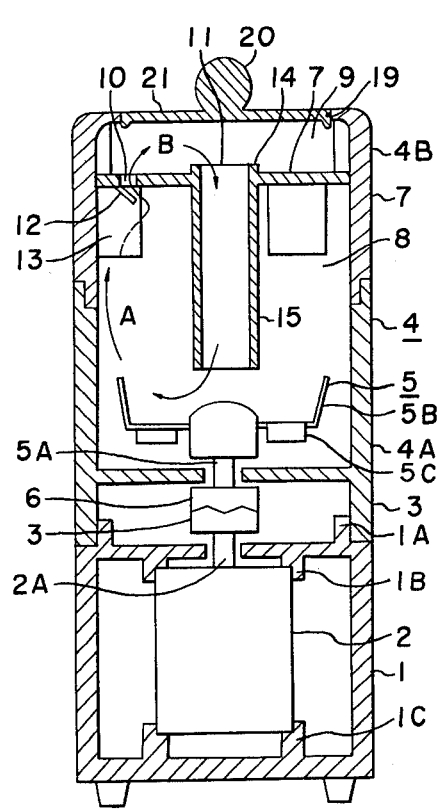
FIG. 7 is a vertical view of the third embodiment of the coffee mill of the present invention.
Figure 8:
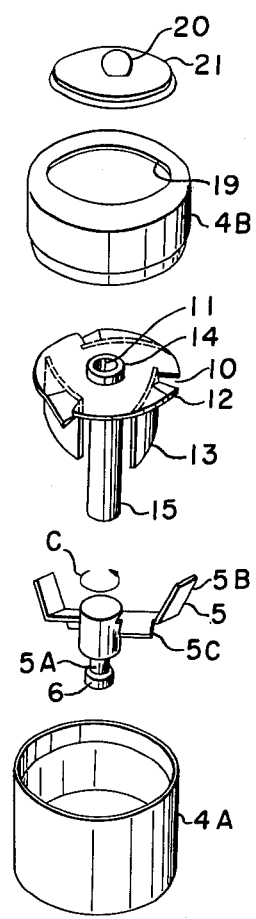
FIG. 8 is a schematic view of the mill casing of the coffee mill shown in FIG. 7 in a disassembled state.

FIGS. 7 and 8 illustrate the third embodiment of the present invention which improves the problem described above. That is, in the third embodiment, an opening 19 is formed in a part of the top wall of the mill casing cover 4B and an auxiliary cover 21 with a knob 20 is detachably fitted to the opening 19.

In accordance with the third embodiment, the waste components of the coffee beans caught in the coffee bean waste component catching space 9 can be disposed by removing the auxiliary cover 21 from the mill casing cover 4B to open the top of the coffee bean waste component catching space 9. The structure of the third embodiment allows one to easily and certainly dispose of the waste components from the opening 19 of the mill casing cover 4B without removing the partition wall 7. Cleaning and handling of the coffee mill can be easy. The construction of the other parts of the third embodiment is the same as that of the first embodiment and accordingly a detailed description is omitted.

The coffee mills of the above embodiments have the structures described above for the purposes of improving the efficiency of separating waste components of coffee beans from useful coffee beans, simplifying the structure, improving handling and easy cleaning. In order to separate the waste components from coffee beans during the pulverizing of coffee beans, the coffee mill is fabricated as follows: the coffee bean waste component catching space is communicated with the cutter receiving space in the mill casing and an air flow producing means is provided to produce air flow which passes from the cutter receiving space through through holes for communicating the spaces with the coffee bean waste component catching space during the pulverizing of coffee beans whereby the waste component of the coffee beans is moved from the cutter receiving space through the through holes to the coffee bean waste component catching space by the air flow produced by the air flow producing means. That is, the main object of the present invention can be attained by dividing the interior of the mill casing 4 by using the partition wall 7, thus eliminating the necessity of forming a special cutter receiving space 8 and coffee bean waste component catching space 9. A container for forming the coffee bean waste component catching space 9 may be communicated with the mill casing 4 by the through holes 11. At least one through hole is formed to communicate between the inside of the mill casing (the cutter receiving space) and the coffee bean waste component catching space 9 in order to transmit the waste components of the coffee beans into the space 9. The first and second guiding members 12 and 13, annular wall 14, the hollow cylindrical body 15 and the annular wall 18 may be eliminated. The blades 5C can also be eliminated when the cutter for pulverizing coffee beans already has the function of the air flow producing means. The mill casing 4 can also be modified.

In attaining objects other than the main object of the present invention, parts such as the partition wall 7 and the second guiding member may be selectively provided depending upon the requirements. For example, the partition wall 7 and the second guiding member 12 may be provided and the other parts such as the first guiding member, annular wall, cylindrical body can be eliminated. The description of the combination of these parts will be omitted because they are easily understood.

It is unnecessary to form the aforementioned parts unitarily with the partition wall, except for the annular wall 14 and the hollowed cylindrical body 15. The shapes of these parts are not limited to those of the embodiments illustrated in the drawings.

As described above, in accordance with the present invention, skin silvers and fine fragments of coffee beans are effectively separated by air flow produced during pulverization of the coffee beans, to be caught by a coffee bean waste component catching space, thus the waste component which is useless for the taste of liquid coffee can be removed. Especially, the difficult and troublesome operation of removing the waste component from coffee powder after pulverization can be conveniently eliminated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A coffee mill comprising:
   a mill casing defining a cutter receiving space and a coffee bean waste component catching spaced formed above said cutter receiving space;
   a pulverizing cutter receiving space;
   communication means for communicating said cutter recieving space with said waste component catching space;
   air flow producing means in said mill casing for producing air flow passing between said cutter receiving space and said waste component catching space, through said communication means;
   a substantially solid partition wall in said mill casing for defining said cutter receiving space together with said casing and said waste component catching space, wherein said pulverizing cutter is rotatable, wherein said communication means comprises at least one first through hole formed in a peripheral portion of said partition wall and a second through hole formed at the center of said partition wall, and wherein said air flow producing means is positioned in said cutter receiving space to produce air flowing from said cutter receiving space through said at least one first through hole to said waste component catching space and flowing back to said cutter receiving space through said second through hole when coffee beans are being pulverized; and
   guiding means associated with one of said casing and said partition wall,
   whereby waste components produced during pulverization of coffee beans are transported by said air flow from said cutter receiving space to said waste component receiving space.

2. The coffee mill according to claim 1 wherein said mill casing comprises a cup-like mill casing body having an open upper end, and a mill casing cover detachably covering said open upper end of said mill casing body.

3. The coffee mill according to claim 1 wherein said mill casing cover comprises a cup-like mill casing cover.

4. The coffee mill according to claim 1 including an auxiliary cover formed in said mill casing cover for opening and closing said coffee bean waste component catching space.

5. A coffee mill according to claim 1 wherein said partition wall is detachably fitted.

6. The coffee mill according to claim 1 wherein said guiding means includes a first air flow guiding member for guiding air flow produced by said air flow producing means to each said at least one first through hole.

7. The coffee mill according to claim 6 wherein each said first air flow guiding member is formed in said partition wall.

8. The coffee mill according to claim 1 wherein said guiding means include a coffee bean guiding member for guiding coffee beans pulverized by said coffee bean pulverizing cutter from the peripheral portion of said cutter receiving space to the interior thereof.

9. The coffee mill according to claim 8 wherein said coffee bean guiding member is formed in said partition wall.

10. The coffee mill according to claim 8 wherein said coffee bean guiding member comprises said first air flow guiding means.

11. The coffee mill according to claim 10 wherein each said first air flow guiding member extends downward from said partition and also extends, while curving inwardly in the direction of rotation of said air flow producing means, from the peripheral edge of said partition to the radially inner portion of one of said first through holes.

12. The coffee mill according to claim 1 wherein said guiding means include a shielding guide member formed at each said first through hole to prevent coffee beans entering into said coffee bean waste component catching space.

13. The coffee mill according to claim 12 wherein each said shielding guide member is formed in said partition wall.

14. The coffee mill according to claim 1 wherein said guiding means include a second air flow guiding member formed at each said first through hole to guide air flowing toward said coffee bean waste component catching space through each said first through hole, in the direction opposite the direction of rotation of said cutter.

15. The coffee mill according to claim 14 wherein each said second air flow guiding member is formed in said partition wall.

16. The coffee mill according to claim 14 wherein each said second air flow guiding member comprises said shielding guiding member.

17. The coffee mill according to claim 16 wherein each said second air flow guiding member is formed at one said first through hole of said parition wall and obliquely extends toward said cutter receiving space and in the direction of rotation of said cutter.

18. The coffee mill according to claim 1 wherein said at least one first through hole comprises a plurality of equidistantly spaced first through holes.

19. The coffee mill according to claim 1 including a hollow cylindrical body formed around said second through hole and projecting into said cutter receiving space.

20. The coffee mill according to claim 1 wherein said hollow cylindrical body projects downwards to a point immediately above said coffee bean pulverizing cutter.

21. The coffee mill according to claim 1 including a first annular wall formed around said second through hole and projecting into said coffee bean waste component catching space.

22. The coffee mill according to claim 1 wherein said partition wall is detachably fitted and a second annular wall is formed in the peripheral portion of said partition wall, said second annular wall projecting into said coffee bean waste component catching space.

23. The coffee mill according to claim 1 wherein said coffee bean pulverizing cutter comprises said air flow producing means.

24. The coffee mill according to claim 23 wherein said coffee bean pulverizing cutter comprises a rotary shaft and a plurality of flat vanes which respectively have planar portions extending radially from said rotary shaft in a single plane and bent portions obliquely extending upwards from the ends of said planar portions.

25. The coffee mill according to claim 1 wherein said coffee bean pulverizing cutter has blades at predetermined positions for providing said air flow producing means.

26. The coffee mill according to claim 25 wherein said coffee bean pulverizing cutter comprises a rotary shaft, a plurality of flat vanes extending at least in part in a single plane from said rotary shaft and blades formed in said planar portion of said vanes.

27. The coffee mill according to claim 25 wherein said coffee bean pulverizing cutter comprises a rotary shaft, a plurality of flat vanes which respectively have planar portions extending radially from said rotary shaft in a single plane, bent portions obliquely extending upwards and blades formed in the planar portion of said vanes obliquely extending downwards in the direction opposite the direction of rotation of said cutter.

28. The coffee mill according to claim 1 wherein said guiding means include:
    at least one first guiding member formed in said partition wall and projecting downwards for guiding air flow and pulverized coffee beans from the periphery of said cutter receiving space to the interior thereof; and
    at least one second guiding member formed in said partition wall and projecting downwards for guiding air flow through said at least one first holes into said waste component catching spaced in the direction opposite the direction of rotation of said cutter and for preventing pulverized coffee beans from entering said waste component catching space.

29. The coffee mill according to claim 28 wherein said mill casing comprises a cup-like mill casing body having an open upper end, a mill casing cover detachably covering said open upper end of said mill casing body.

30. The coffee mill according to claim 28 wherein said mill casing cover comprises a cup-like mill casing cover.

31. The coffee mill according to claim 30 including an auxiliary cover formed in said mill casing cover for opening and closing said coffee bean waste component catching space.

32. The coffee mill according to claim 31 wherein said partition wall is detachably fitted.

33. The coffee mill according to claim 28 wherein each said at least one first air flow guiding member extends, while curving inwardly in the direction of rotation of said air flow producing means, from the peripheral edge of said partition to the radially inner portion of one of said first through holes.

34. The coffee mill according to claim 28 wherein each said second guiding member is formed at one said first through hole of said partition wall and obliquely extends toward said cutter receiving space in the direction of rotation of said cutter.

35. The coffee mill according to claim 28 wherein said at least one through hole comprises a plurality of equidistantly spaced first through holes.

36. The coffee mill according to claim 28 including a hollow cylindrical body formed around said second through hole and projecting into said cutter receiving space.

37. The coffee mill according to claim 36 wherein said hollow cylindrical body projects downwards to a point immediately above said coffee bean pulverizing cutter.

38. The coffee mill according to claim 28 or 36 including a first annular wall formed around said second through hole and projecting into said coffee bean waste component catching space.

39. The coffee mill according to claim 38 wherein said mill casing comprises a cup-like mill casing body having an open upper end, a mill casing cover detachably covering said open upper end of said mill casing body.

40. The coffee mill according to claim 38 wherein said mill casing cover comprises a cup-like mill casing cover.

41. The coffee mill according to claim 40 including an auxiliary cover formed in said mill casing cover for opening and closing said coffee bean waste component catching space.

42. The coffee mill according to claim 38 wherein said partition wall is detachably fitted.

43. The coffee mill according to claim 38 wherein each said at least one first air flow guiding member extends, while curving inwardly in the direction of rotation of said air flow producing means, from the peripheral edge of said partition to the radially inner portion of one of said first through holes.

44. The coffee mill according to claim 38 wherein each said second guiding member is formed at one said first through hole of said partition wall and obliquely extends toward said cutter receiving space in the direction of rotation of said cutter.

45. The coffee mill according to claim 38 wherein said at least one through hole comprises a plurality of equidistantly spaced first through holes.

46. The coffee mill according to claim 38 wherein said hollow cylindrical body projects downwards to a point immediately above said coffee bean pulverizing cutter.

47. The coffee mill according to claim 38 wherein said partition wall is detachably fitted and a second annular wall is formed in the peripheral portion of said partition wall, said second annular wall projecting into said coffee bean waste component catching space.

48. The coffee mill according to claim 38 wherein said coffee bean pulverizing cutter comprises said air flow producing means.

49. The coffee mill according to claim 48 wherein said coffee bean pulverizing cutter comprises a rotary shaft and a plurality of flat vanes which respectively have planar portions extending radially from said rotary shaft in a single plane and bent portions obliquely extending upwards from the end of said planar portions.

50. The coffee mill according to claim 38 wherein said coffee bean pulverizing cutter has blades at predetermined positions for providing said air flow producing means.

51. The coffee mill according to claim 38 wherein said coffee bean pulverizing cutter comprises a rotary shaft, a plurality of flat vanes extending at least in part in a single plane from said rotary shaft and blades formed in said planar portion of said vanes.

52. The coffee mill according to claim 50 wherein said coffee bean pulverizing cutter comprises a rotary shaft, a plurality of flat vanes which respectively have planar portions extending radially from said rotary shaft in a single plane, bent portions obliquely extending upwards and blades formed in the planar portion of said vanes obliquely extending downwards in the direction opposite the direction of rotation of said cutter.

53. The coffee mill according to claim 28 wherein said partition wall is detachably fitted and a second annular wall is formed in the peripheral portion of said partition wall, said second annular wall projecting into said coffee bean waste component catching space.

54. The coffee mill according to claim 28 wherein said coffee bean pulverizing cutter comprises said air flow producing means.

55. The coffee mill according to claim 54 wherein said coffee bean pulverizing cutter comprises a rotary shaft and a plurality of flat vanes which respectively have planar portions extending radially from said rotary shaft in a single plane and bent portions obliquely extending upwards from the ends of said planar portions.

56. The coffee mill according to claim 28 wherein said coffee bean pulverizing cutter has blades at predetermined positions for providing said air flow producing means.

57. The coffee mill according to claim 56 wherein said coffee bean pulverizing cutter comprises a rotary shaft, a plurality of flat vanes extending at least in part in a single plane from said rotary shaft and blades formed in said planar portion of said vanes.

58. The coffee mill according to claim 56 wherein said coffee bean pulverizing cutter comprises a rotary shaft, a plurality of flat vanes which respectively have planar portions extending radially from said rotary shaft in a single plane, bent portions obliquely extending upwards and blades formed in the planar portion of said vanes obliquely extending downwards in the direction opposite the direction of rotation of said cutter.

* * * * *